United States Patent

[11] 3,588,621

[72] Inventor Quentin L. Schneider
Bensenville, Ill.
[21] Appl. No. 789,557
[22] Filed Jan. 7, 1969
[45] Patented June 28, 1971
[73] Assignee General Time Corporation
Stamford, Conn.

[54] ELECTRONIC PULSE SOURCE FOR ELAPSED TIME INDICATOR
12 Claims, 2 Drawing Figs.

[52] U.S. Cl. .......... 317/142, 307/132, 331/111
[51] Int. Cl. .......... H01h 47/18, H03k 3/26
[50] Field of Search .......... 317/142; 331/111; 307/132 (ER)

[56] References Cited
UNITED STATES PATENTS

| | | | |
|---|---|---|---|
| 3,229,225 | 1/1966 | Schimpf | 331/111 |
| 3,299,627 | 1/1967 | Hart et al. | 331/111X |
| 3,378,693 | 4/1968 | Schmidt | 331/111X |
| 3,466,506 | 9/1969 | Badovinac et al. | 317/142 |

*Primary Examiner*—Lee T. Hix
*Attorneys*—Richard A. Joel and H. Hulse

ABSTRACT: An electronic pulse generator for supplying electrical input pulses to an elapsed time indicator. The generator includes a source of supply voltage, an output means for connecting the generator to the input coil of an elapsed time indicating mechanism, and a pair of transistors connected in circuit with the source and the output means for controlling the production of output signals at the output means. Associated with the transistor pair is a capacitor and another pair of transistors which cooperate to render the first transistor pair alternately conductive and nonconductive in response to charging and discharging of the capacitor to predetermined levels to produce a series of output pulses at the output means.

INVENTOR
QUENTIN L. SCHNEIDER by: Wolfe, Hubbard, Voit & Osann
ATTYS.

ELECTRONIC PULSE SOURCE FOR ELAPSED TIME INDICATOR

DESCRIPTION OF THE INVENTION

The present invention relates generally to an improved electronic pulse generator and, more particularly, to an improved source of input pulses for elapsed time indicators of the type wherein electrical input pulses periodically energize a solenoid to actuate an elapsed time indicating mechanism.

It is a primary object of the present invention to provide an improved electronic pulse generator which produces pulses with a high degree of accuracy over a relatively wide range of environmental conditions. In this connection, one particular object of the invention is to provide such a pulse generator which has a high degree of accuracy over a relatively wide temperature range.

It is another object of the invention to provide an improved electronic pulse generator of the foregoing type which produces repetitive pulses of constant width and amplitude and at a constant rate with a high degree of reliability.

Still another object of the invention is to provide such an improved electronic pulse generator which has increased drive capability for low impedance loads.

A further object of the present invention is to provide such an improved electronic pulse generator which suppresses radiated and conducted electromagnetic interference.

Yet another object of the invention is to provide such an improved electronic pulse generator which provides reliable high-temperature cutoff.

A still further object of the present invention is to provide an improved electronic pulse generator of the type described above which can be efficiently produced at a low cost.

Figure 1:
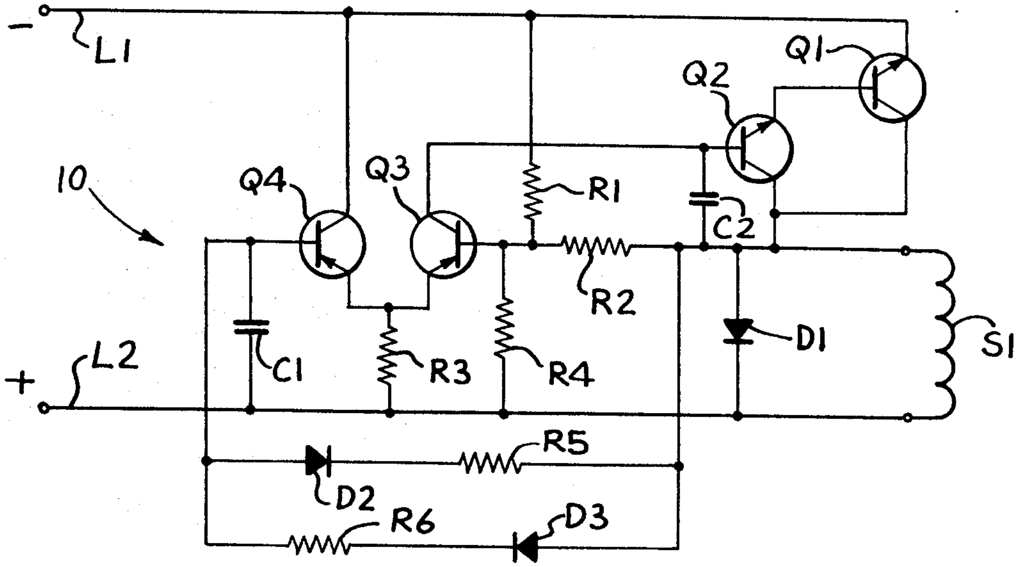
Figure 2:
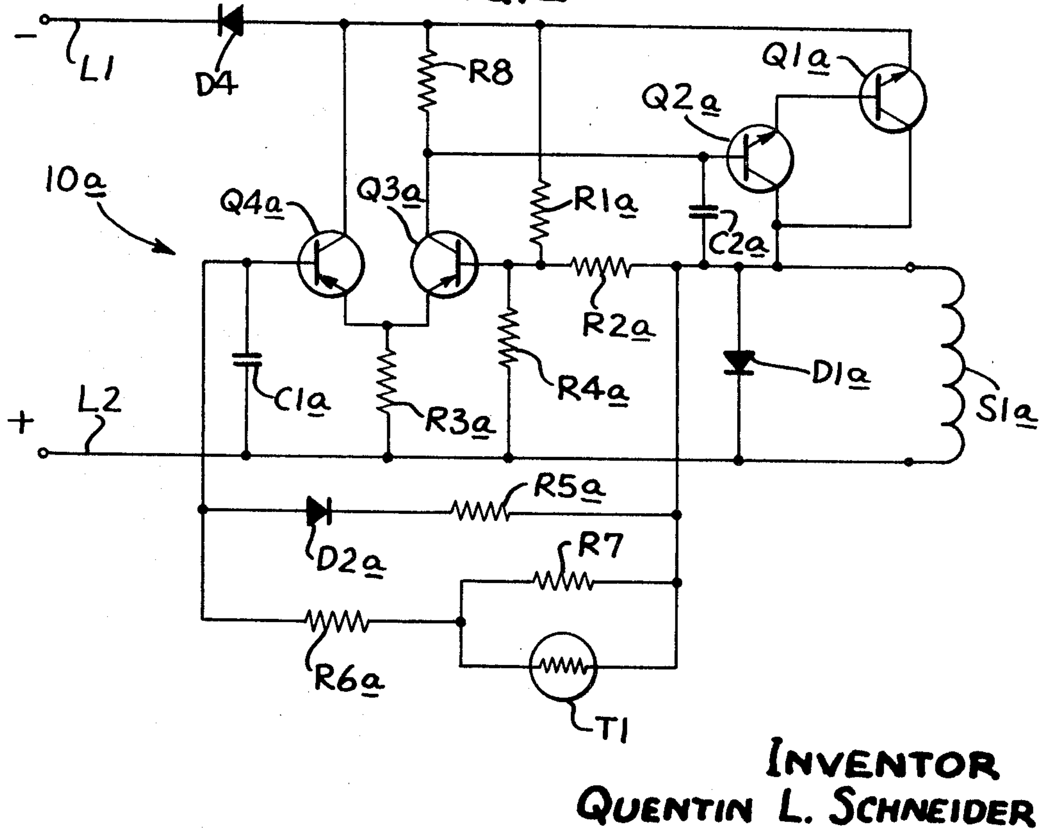

Other objects and advantages of the invention will become apparent from the following description and the accompanying drawings, in which:

FIG. 1 is a schematic circuit diagram of an electronic pulse generator embodying the present invention; and FIG. 2 is a schematic circuit diagram of a modified pulse generator embodying the present invention.

While the invention is susceptible of various modifications and alternative forms, certain specific embodiments thereof have been shown by way of example in the drawings which will be described in detail herein. It should be understood, however, that it is not intended to limit the invention to the particular forms disclosed but, on the contrary, the invention is to cover all modifications, equivalents, and alternatives falling within the spirit and scope of the invention.

Turning now to the drawings, the preferred circuit illustrated in FIG. 1 includes a free-running multivibrator 10 for driving the solenoid S1 of an elapsed time indicator (not shown) such as that disclosed in U.S. Pat. No. 3,229,225 to Schimpf. The input leads L1 and L2 of the multivibrator 10 are connected to the output terminals of a direct current source; in a typical commercial embodiment of the circuit to be described, the negative terminal of the current source, which is connected to lead L1, is at a potential of −28 volts below the other terminal, which is connected to the lead L2. When the current source is connected to the leads L1 and L2, output pulses are generated in the solenoid coil S1 at regular intervals, and the solenoid converts such pulses to mechanical movement to provide a mechanical indication of elapsed time. Since the time indicating mechanism produces incremental mechanical movements at the frequency of the pulses produced in the coil S1, the accuracy of the indicator is inherently dependent upon the accuracy of the pulses generated by the multivibrator 10.

In accordance with one aspect of the present invention, a pair of transistors are connected in circuit with the input and output means with the control input of a first one of the transistors connected to the second transistor, and a capacitor having a charging circuit including a third transistor is connected to the control input of the second transistor for rendering the first and second transistors conductive during the charging of the capacitor so that an output signal is produced at the output means. Thus, in the illustrative embodiment, a pair of transistors Q1 and Q2 are connected in circuit with the leads L1, L2 and the solenoid S1, and a capacitor C1 having a charging circuit including a third transistor Q3 is connected to the base of the transistor Q2. When the current source is connected to the leads L1 and L2, output pulses are generated in the solenoid coil S1 in response to the charging and discharging of the capacitor C1.

In keeping with a further important aspect of the invention, the capacitor C1 also has a discharging circuit including a fourth transistor Q4 having a control input connected to the capacitor C1 for rendering the transistor Q4 conductive in response to the charging of the capacitor C1 to a predetermined level, and for rendering the transistor Q4 nonconductive in response to the discharging of the capacitor to a predetermined level. To render the first and second transistors Q1 and Q2 alternately conductive and nonconductive to produce successive output signals at the coil S1, the fourth transistor Q4 is also connected to the third transistor Q3 for rendering the transistor Q3 alternately conductive and nonconductive in response to the charging and discharging of the capacitor C1. In order to understand the operation of the illustrative circuit in FIG. 1 in more detail, assume that the capacitor C1 is initially uncharged and the base of the transistor Q4 is at ground potential, so that the transistor Q4 is cut off. In this operative state, a voltage divider formed by a pair of resistors R1 and R4 applies a voltage to the base of the transistor Q3 so as to render the transistor Q3 conductive. Current then flows from the collector of the transistor Q3 to the base of the transistor Q2, which in turn supplies collector current to the base of the transistor Q1, thereby turning on the transistor Q1. Consequently, both transistors Q1 and Q2 are in the conductive state so that a resistor R2 connected between the base of transistor Q3 and the collectors of transistors Q1 and Q2 is, in effect, in parallel with resistor R1; this sets the voltage on the base of transistor Q3 at a predetermined level, such as 16 volts, for example.

When the transistors Q1 and Q2 are conducting, current flows through the solenoid coil S1 thereby producing an output signal. At the same time, current flows through a timing network comprising a resistor R5 and diode D2 to charge the capacitor C1, i.e., that side of the capacitor C1 connected to the base of transistor Q4 is drawn toward the negative potential of the terminal connected to lead L1. When the capacitor C1 charges to a predetermined level, such as 16 volts, base current begins to flow in the transistor Q4. The transistor Q4 is thus rendered conductive, and the resulting emitter current pulls the voltage up across a resistor R3 connected from lead L2 to the common emitters of transistors Q3 and Q4, thereby rendering the transistor Q3 nonconductive. The turning off of transistor Q3 in turn cuts off transistors Q1 and Q2 and, consequently, the current through the solenoid coil S1 falls rapidly, thereby completing one output pulse. In order to avoid a high positive voltage transient on the collectors of the transistors Q1 and Q2, as a result of self-induced voltage in the coil S1 due to the rapid collapse of the magnetic field, a clamping diode D1 is connected across the coil S1.

When the transistors Q1, Q2 and Q3 are nonconductive, the resistor R2 is effectively in parallel with the resistor R4 through the small resistance of the solenoid coil S1, and the voltage at the base of the transistor Q3 is established at a predetermined lower level such as 12 volts. In this operative state, the capacitor C1 begins to discharge through a timing network comprising a resistor R6 and diode D3, connected in parallel with resistor R5 and diode D2, until the capacitor C1 has discharged to approximately 12 volts. At this point, the transistor Q4 is rendered nonconductive again, and transistor Q3 is rendered conductive to once again turn on the pair of transistors Q1 and Q2. This again produces an output signal at the solenoid coil S1, and initiates recharging of the capacitor C1, thereby completing one operating cycle. This cycle is, of course, automatically repeated as long as the current source remains connected to the leads L1 and L2.

In FIG. 2, there is illustrated a modified embodiment of the invention in which elements similar to those described above in connection with FIG. 1 have been identified by similar reference symbols with the addition of the distinguishing suffix "a." In accordance with one particular aspect of the modified embodiment of the invention shown in FIG. 2, a thermistor is connected in the charging and discharging circuits of the capacitor C1*a* for automatically compensating for thermal variations in the capacitor C1*a*. More particularly, a thermistor T1 and a resistor R7, connected in parallel with each other, are substituted for the diode D3 in the circuit arrangement of FIG. 1. When the capacitor C1*a* charges, the charging current flows through the timing network formed by diode D2*a*, resistors R5*a*, R6*a* and R7, and thermistor T1, during discharge of capacitor C1*a*, the diode D2*a* prevents current flow through resistor R5*a*, and thus the timing network is formed by resistors R6*a* and R7 and thermistor T1. As temperature variations alter the characteristics of the capacitor C1*a*, the thermistor T1 automatically responds to the same temperature changes to alter the resistance of the timing network. It will be appreciated that the values of the resistors R5*a*, R6*a*, and R7 in this circuit arrangement are selected to provide the desired pulse width, time, and thermal compensation.

As another feature of the modified embodiment of the invention illustrated in FIG. 2, a resistor is connected between the circuit input means and the control input of the transistor Q2*a* for providing improved high temperature cutoff. More particularly, a resistor R8 is connected between the lead L1 and the base of the transistor Q2*a* so as to shunt the two transistors Q1*a* and Q2*a* when these transistors are rendered nonconductive. Thus, the resistor R8 provides a shunt path for collector leakage from transistor Q3*a* past the pair of transistors Q1*a* and Q2*a*, and by this means allows cutoff of the transistor pair Q1*a*, Q2*a* during the "off" portion of the cycle at elevated temperatures. Otherwise, the operation of the circuit shown in FIG. 2 is the same as that described above for the circuit of FIG. 1; the diode D4 connected to the lead L1 simply prevents damage in the event of incorrect polarity on the 28V supply line (this diode is not used in the circuit of FIG. 1, to reduce losses due to semiconductor junction voltage drops).

Although it will be understood that many different values may be used for the various circuit elements in the illustrative systems, the following is a list of the values employed in a preferred embodiment of the circuit of FIG. 1 to provide output pulses of 25 milliseconds duration at a rate of 1 pulse per second, over a typical temperature range of −20° C. to +55° C., with an accuracy within ±5 percent:

| | |
|---|---|
| R1 | 10 K |
| R2 | 10 K |
| R3 | 10 K |
| R4 | 10 K |
| R5 | 1.5 K |
| R6 | 100 K nom. |
| D1 | 1N645 |
| D2 | 1N645 |
| D3 | 1N645 |
| Q1 | 2N720A |
| Q2 | 2N720A |
| Q3 | 2N2907 |
| Q4 | 2N2907 |
| C1 | 15μf. |
| C2 | 220pf. |

The following is a list of the values employed in a preferred embodiment of the circuit of FIG. 2 to provide output pulses of 25 milliseconds duration at a rate of 10 pulses per second, over a typical temperature range of −55° C. to +125° C., with an accuracy within ±5 percent:

| | |
|---|---|
| R1A | 16 K |
| R2A | 40 K |
| R3A | 50 K |
| R4A | 15 K |
| R5A | 100 K nom. |
| R6A | 250 K nom. |
| R7A | 30 K nom. |
| R8A | 50 K |
| D1A | 1N645 |
| D2A | 1N645 |
| D4A | 1N645 |
| T1A | 20 K |
| Q1A | 2N720A |
| Q2A | 2N720A |
| Q3A | 2N2907 |
| Q4A | 2N2907 |
| C1A | 1μf. |
| C2A | 220pf. |

The nominal (nom.) values in the above lists are given in locations where selection is done to obtain appropriate pulse width, period, and thermal compensation.

As can be seen from the foregoing detailed description, the present invention provides an improved source of input pulses for elapsed time indicators of the type which require electrical input pulses to periodically energize a solenoid to actuate an elapsed time indicating mechanism. More particularly, the pulse generator provided by this invention has a high degree of accuracy over a relatively wide range of environmental conditions, and the particular embodiment shown in FIG. 2 is especially accurate over a wide temperature range because of the compensating effect of the thermistor T1. The transistor pair Q1, Q2 provides increased drive capability to a low impedance load, while the overall circuit arrangement provides repetitive pulses of constant width and amplitude at a constant rate with a high degree of reliability. This reliability is enhanced by the capacitor C2, which suppresses radiated and conducted electromagnetic interference, and the resistor R8 in the circuit of FIG. 2, which provides reliable high temperature cutoff by providing a shunt path for collector leakage from transistor Q3A past the transistor pair Q1*a*, Q2*a*. Furthermore, the improved circuit arrangement provided by this invention can be efficiently produced at a low cost.

I claim:

1. An improved electronic pulse generator for supplying electrical input pulses to an elapsed time indicator, said generator comprising the combination of input means for connecting said generator to a source of supply voltage, output means for connecting said generator to the input coil of an elapsed time indicating mechanism, a pair of transistors connected in circuit with said input and output means with the control input of a first one of said transistors connected to the second transistor, a capacitor operatively connected to said pair of transistors, a charging circuit for said capacitor including said pair of transistors, a third transistor operatively connected to the control input of said second transistor for rendering the first and second transistors conductive during the charging of said capacitor whereby an output signal is provided at said output means, and a fourth transistor having a control input connected to said capacitor for rendering the fourth transistor conductive in response to the charging of said capacitor to a predetermined level, and a discharging circuit for said capacitor for rendering the fourth transistor nonconductive in response to the discharging of said capacitor to a predetermined level, said fourth transistor being operatively connected to said third transistor for rendering the third transistor alternately conductive and nonconductive in response to the charging and discharging of said capacitor whereby said first and second transistors are also rendered alternately conductive and nonconductive to produce successive output pulses at said output means.

2. An improved electronic pulse generator as set forth in claim 1 which includes a second capacitor operatively connected between said output means and the control input of said second transistor for increasing the rise and fall times of said output signal and for suppressing electromagnetic interference.

3. An improved electronic pulse generator as set forth in claim 1 in which a solenoid coil is connected to said output means and a diode is connected across said output means.

4. An improved electronic pulse generator as set forth in claim 1 which includes a thermistor connected in the charging and discharging circuits of said capacitor for automatically compensating for thermal variations in said capacitor.

5. An improved pulse generator as set forth in claim 1 which includes a resistor connected from said input means to the control input of said second transistor for shunting said first and second transistors when said first and second transistors are rendered nonconductive.

6. An improved electronic pulse generator for supplying repetitive input pulses to an elapsed time indicator, said pulse generator comprising the combination of input means for connecting the generator to a current source, a capacitor operatively connected to said input means via a timing network, output means for connecting the generator to the solenoid coil of an elapsed time indicating mechanism, a control circuit operatively connected to said input means, capacitor, and output means for producing an output signal at said output means while charging said capacitor, said control circuit including first electronic switching means for automatically terminating said output signal and the charging of said capacitor in response to a predetermined charge on said capacitor, and for automatically resuming the charging of said capacitor in response to the discharge of said capacitor to a predetermined level said control circuit also including second electronic switching means operatively connected to said first electronic switching means for automatically resuming said output signal in response to the discharge of said capacitor to said predetermined level.

7. An improved electronic pulse generator for supplying electrical input pulses to an elapsed time indicator, said generator comprising the combination of input means for connecting said generator to a source of supply voltage, output means for connecting said generator to the input coil of an elapsed time indicating mechanism, a capacitor operatively connected to said input and output means, a charging circuit operatively connected to said capacitor, first electronic switching means having a control input for rendering said first electronic switching means conductive during the charging of said capacitor, said output means being operatively connected to said charging circuit for receiving an output pulse during the charging of said capacitor, said charging circuit including second electronic switching means having a control input for rendering the same conductive in response to the conduction of said first switching means, third electronic switching means having a control input for rendering said third electronic switching means conductive when the charging of said capacitor reaches a predetermined level, said third switching means being operatively connected to said first switching means for rendering said first switching means nonconductive in response to conduction of said third switching means whereby said second switching means is also rendered nonconductive to terminate the output pulse at said output means.

8. An improved pulse generator as set forth in claim 7 which includes a second capacitor operatively connected between said second switching means and the control input of said first switching means for increasing the rise and fall times of said output pulse and for suppressing radiated and conducted electromagnetic interference.

9. An improved pulse generator as set forth in claim 7 in which a solenoid coil is connected to said output means and a diode is connected across said output means.

10. An improved pulse generator as set forth in claim 7 which includes a thermistor connected in the charging and discharging circuits of said capacitor for automatically compensating for thermal variations in said capacitor.

11. An improved pulse generator as set forth in claim 7 which includes a resistor connected between the control input of said first switching means and said input means for shunting said first and second switching means when said first and second switching means are rendered nonconductive.

12. An improved electronic pulse generator for supplying repetitive input pulses to an elapsed time indicator, said pulse generator comprising the combination of input means for connecting the generator to a current source, a capacitor operatively connected to said input means via a timing network, output means for connecting the generator to the solenoid coil of an elapsed time indicating mechanism, a charging circuit for said capacitor including first and second transistors operatively connected between said input means and said capacitor and third and fourth transistors operatively connected to said capacitor and said first and second transistors for rendering said first and second transistors conductive in response to a charge on said capacitor below a first predetermined level, said first and second transistors also being operatively connected to said output means.